No. 671,228. Patented Apr. 2, 1901.
W. PAINTER.
PROCESS OF MAKING GLUTINOUS COMPOUNDS.
(Application filed Apr. 22, 1898. Renewed Sept. 17, 1900.)

(No Model.)

Attest
F. L. Middleton
C. S. Middleton

Inventor
William Painter
by Ellis Spear
Atty.

UNITED STATES PATENT OFFICE.

WILLIAM PAINTER, OF BALTIMORE, MARYLAND, ASSIGNOR TO THE CROWN CORK AND SEAL COMPANY, OF SAME PLACE.

PROCESS OF MAKING GLUTINOUS COMPOUNDS.

SPECIFICATION forming part of Letters Patent No. 671,228, dated April 2, 1901.

Application filed April 22, 1898. Renewed September 17, 1900. Serial No. 30,341. (No specimens.)

*To all whom it may concern:*

Be it known that I, WILLIAM PAINTER, a citizen of the United States, residing at Baltimore, Maryland, have invented certain new and useful Improvements in Processes of Making Glutinous Compounds, of which the following is a specification.

My invention relates to the manufacture of compounds in which gluten and a body material with or without glycerin are the principal elements. Such compositions I have discovered possess the quality of insolubility in water and have flexibility to the desired degree to render the composition suitable, for instance, as a waterproof coating for fabrics or for other uses where such qualities as insolubility and flexibility are called for.

The compound is formed by intimately mixing the gluten and glycerin together, so as to effect the solution of the plastic gluten in the glycerin, heat being sometimes used in the process in order to effect that desired change in the nature of the gluten, which makes it more repellent to liquids.

In forming these compounds it is to be understood that the gluten is used in the wet, plastic state which it assumes as extracted from cereal substances containing it and that in this state it contains a proportion of water which may be regarded as its water of constitution, the entire loss of which would render it hard and inelastic unless wholly or in part replaced by the glycerin, and that in the processes herein referred to more or less of this water of constitution may be retained. It is also to be understood that owing to the well-known affinity of glycerin for water or its hygroscopic nature whatever of the water of constitution of the gluten may remain in the completed product is prevented from subsequent evaporation while exposed to the atmosphere by this affinity of glycerin for it, the glycerin itself being less volatile than the water which it may hold in combination. I have also found that in cases where the water of constitution of the plastic gluten is wholly replaced by the glycerin in the processes of combining the several ingredients if a sufficient proportion of glycerin is thus substituted for the water its affinity for water will cause it to absorb more or less of moisture from the atmosphere after the product is completed. Thus by regulating the amount of glycerin or water of constitution retained in the completed product a certain permanence is given to it as to elasticity and pliability. In the application of heat, therefore, I find that it is necessary for the best results to exercise care in order to properly regulate the amount of glycerin or water allowed to remain in the completed product. A sufficient quantity of the glycerin or of the water of constitution, or both, must be permanently retained in the compound in order to impart to it such pliability or flexibility as may be essential to fabrics to which it may be applied or for meeting the requirements of other uses to which the compound may be put and to prevent deterioration in these respects from age. This step of using heat in my process I refer to in my applications for Letters Patent of the United States, filed January 14, 1898, Serial Nos. 666,662, 666,663, and 666,664—that is, the subjection of the gluten or the compounds before, during, or after admixture to a temperature higher than that of the atmosphere for the indurating effect on the gluten. In the application of these higher temperatures to the various compounds of gluten, glycerin, and a body material, and particularly those containing glycerin as one of the component elements, it is advantageous, as above indicated, to provide a way by which the indurating action may go on to the desired point without causing the loss of any of the glycerin or water of constitution through the volatilization of either, and for this purpose I subject the compound to heat while excluding the outside air therefrom. The amount of water of constitution of the wet gluten allowed to remain in the compound before subjecting it to the indurating action of heat under exclusion from the atmosphere is obtained by manipulating the ingredients under a sufficiently high temperature while exposed to the atmosphere to evaporate the water to a desired point, while keeping the temperature below that at which the glycerin would also evaporate.

The drawings show the means by which the indurating of the gluten is effected as excluded from the air.

Figure 1 is a vertical sectional view, while

Figure 1:
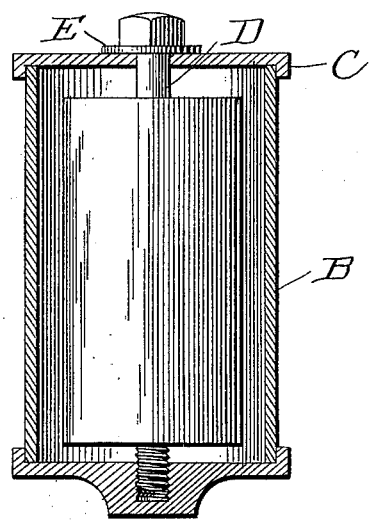
Figure 2:
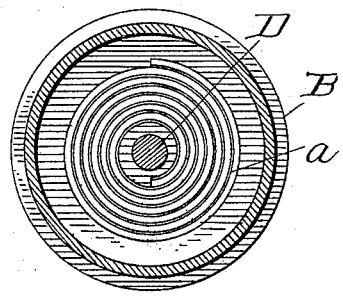
Fig. 2 is a transverse sectional view, of an air-tight digester.

The apparatus comprises an air-tight digester having a body B, a cover C, and a central bolt D, with its lower end screwed into the bottom of the digester and its headed upper end bearing upon a washer E on the outer face of the cover.

In carrying out my method the ingredients, including the gluten and glycerin or the gluten, glycerin, and body material, are intimately mixed together, so that the complete solution of the gluten in the glycerin or a complete incorporation of the three ingredients is effected under a sufficiently high temperature, so that the desired amount of the water of constitution is evaporated away. The material, if in sheet form, is then placed in this air-tight digester, preferably in the form of a loose roll, and then the digester is placed in an oven or subjected to heat in any desired way. By this method of indurating the material the outside air is excluded from contact with the material and the loss of the glycerin or water of constitution through volatilization under the action of the heat is prevented.

Instead of placing the material in the digester in the form of a loose roll it may sometimes be desirable to roll it tightly in order to place the same under some mechanical pressure, in which case a thin sheet of metal $a$ may be rolled up tightly with and between the folds of the material in order to prevent the parts of the roll from sticking together, or it may be clamped in form of sheets between plates in a portable press or compressed in molds of any desired form and the whole placed in the digester.

I claim—

1. The herein-described process consisting in subjecting glutinous compounds to heat during admixture to regulate the amount of water to be retained therein and subsequently subjecting them to heat while excluding the air therefrom, substantially as described.

2. The herein-described process consisting in subjecting compounds, of which gluten in the plastic state and glycerin are component elements, to heat while excluding the air therefrom, substantially as described.

3. The herein-described process of treating glutinous compounds consisting in subjecting the same to pressure and heat while excluding the air therefrom.

In testimony whereof I affix my signature in presence of two witnesses.

WILLIAM PAINTER.

Witnesses:
JOHN T. HAWKINS,
W. H. WHEELER.